US012664817B2

(12) United States Patent
Onishi

(10) Patent No.: US 12,664,817 B2
(45) Date of Patent: Jun. 23, 2026

(54) INFORMATION PROCESSING DEVICE FOR GENERATING A FACE IMAGE WITH CONVERTING ATTRIBUTE OF THE FAME IMAGE, IMAGE PROCESSING METHOD FOR IMPLEMENTING THE SAME, AND RECORDING MEDIUM FOR IMPLEMENTING THE SAME

(71) Applicant: NEC Corporation, Tokyo (JP)

(72) Inventor: Yoshifumi Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 312 days.

(21) Appl. No.: 18/519,343

(22) Filed: Nov. 27, 2023

(65) Prior Publication Data

US 2024/0177520 A1 May 30, 2024

(30) Foreign Application Priority Data

Nov. 30, 2022 (JP) ................................. 2022-191125

(51) Int. Cl.
*G06V 10/74* (2022.01)
*G06V 40/16* (2022.01)

(52) U.S. Cl.
CPC .......... *G06V 40/161* (2022.01); *G06V 10/761* (2022.01); *G06V 40/172* (2022.01); *G06V 40/178* (2022.01)

(58) Field of Classification Search
CPC .. G06V 40/161; G06V 10/761; G06V 40/172; G06V 40/178
See application file for complete search history.

(56) References Cited

U.S. PATENT DOCUMENTS

| | | | | |
|---|---|---|---|---|
| 10,963,677 | B2 * | 3/2021 | Henderson | G06N 3/09 |
| 11,080,316 | B1 * | 8/2021 | Das | G06F 16/434 |
| 2014/0140625 | A1 * | 5/2014 | Zhang | G06V 20/30 |
| | | | | 382/195 |
| 2015/0286857 | A1 * | 10/2015 | Kim | G06V 10/772 |
| | | | | 382/118 |

FOREIGN PATENT DOCUMENTS

JP 2014-170488 A 9/2014

OTHER PUBLICATIONS

Pablo Negri, Sandro Cumani, and Andrea Bottino: "Tackling Age-Invariant Face Recognition With Non-Linear PLDA and Pairwise SVM"; Mar. 4, 2021; IEEE Access; pp. 1-16 (Year: 2021).*

* cited by examiner

*Primary Examiner* — Siamak Harandi

(57) ABSTRACT

In the image processing device, the score calculation means calculate a first similarity score group indicating similarity between a first face image and each of n face images, and m second similarity score groups indicating similarity between m second face images obtained by converting an attribute of the first face image and each of the n face images. The score distribution acquisition means acquires the first score distribution indicating a distribution state of the first similarity score group, and the m second score distributions indicating a distribution state each of the m second similarity score groups. The conversion parameter acquisition means acquires one conversion parameter based on a comparison result between the first score distribution and the m second score distributions. The image generation means generates a face image by converting the attribute of the first face image based on the conversion parameter.

8 Claims, 6 Drawing Sheets

13

13

INFORMATION PROCESSING DEVICE FOR GENERATING A FACE IMAGE WITH CONVERTING ATTRIBUTE OF THE FAME IMAGE, IMAGE PROCESSING METHOD FOR IMPLEMENTING THE SAME, AND RECORDING MEDIUM FOR IMPLEMENTING THE SAME

TECHNICAL FIELD

The present disclosure relates to a technique of image processing which generates an image different from an original image.

BACKGROUND ART

In recent years, there has been proposed a technique for generating an image different from an original image by performing image processing on the original image.

Specifically, for example, Patent Document 1 discloses a method of calculating an age difference vector indicating the change of the face according to the age from average face data of different age groups and processing the face image of the target person using the age difference vector to generate another face image in which the age of the face image is converted.

Patent Document 1: Japanese Patent Application Laid-Open under No. 2014-170488

SUMMARY

However, according to the technique disclosed in Patent Document 1, there is a case where an image in which the identity of the original image is impaired is generated as a face image after the age conversion.

One object of the present disclosure is to provide an image processing device capable of generating an image in which the attribute of the original image is converted so that the identity of the original image is maintained.

According to an example aspect of the present invention, there is provided an image processing device comprising:

a score calculation means configured to calculate a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≥2) conversion methods to the first face image;

a score distribution acquisition means configured to acquire a first score distribution and m second score distributions, the first score distribution indicating a distribution state of at least a part of the similarity scores in the first similarity score group, the m second score distributions indicating a distribution state of at least a part of the similarity scores in each of the m second similarity score groups;

a conversion parameter acquisition means configured to acquire at least one conversion parameter corresponding to at least one conversion method from among the m conversion methods based on a comparison result between the first score distribution and the m second score distributions, and an image generation means configured to generate a face image by converting the attribute of the first face image based on the conversion parameter.

According to another example aspect of the present invention, there is provided an image processing method comprising:

calculating a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≥2) conversion methods to the first face image;

acquiring a first score distribution and m second score distributions, the first score distribution indicating a distribution state of at least a part of the similarity scores in the first similarity score group, the m second score distributions indicating a distribution state of at least a part of the similarity scores in each of the m second similarity score groups;

acquiring at least one conversion parameter corresponding to at least one conversion method from among the m conversion methods based on a comparison result between the first score distribution and the m second score distributions, and generating a face image by converting the attribute of the first face image based on the conversion parameter.

According to still another example aspect of the present invention, there is provided a recording medium recording a program, the program causing a computer to execute processing comprising:

calculating a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≥2) conversion methods to the first face image;

acquiring a first score distribution and m second score distributions, the first score distribution indicating a distribution state of at least a part of the similarity scores in the first similarity score group, the m second score distributions indicating a distribution state of at least a part of the similarity scores in each of the m second similarity score groups;

acquiring at least one conversion parameter corresponding to at least one conversion method from among the m conversion methods based on a comparison result between the first score distribution and the m second score distributions, and generating a face image by converting the attribute of the first face image based on the conversion parameter.

According to the present disclosure, it is possible to generate an image in which the attribute of the original image is converted so that the identity of the original image is maintained.

EXAMPLE EMBODIMENTS

Preferred example embodiments of the present disclosure will be described with reference to the accompanying drawings.

First Example Embodiment

[Hardware Configuration]

Figure 1:
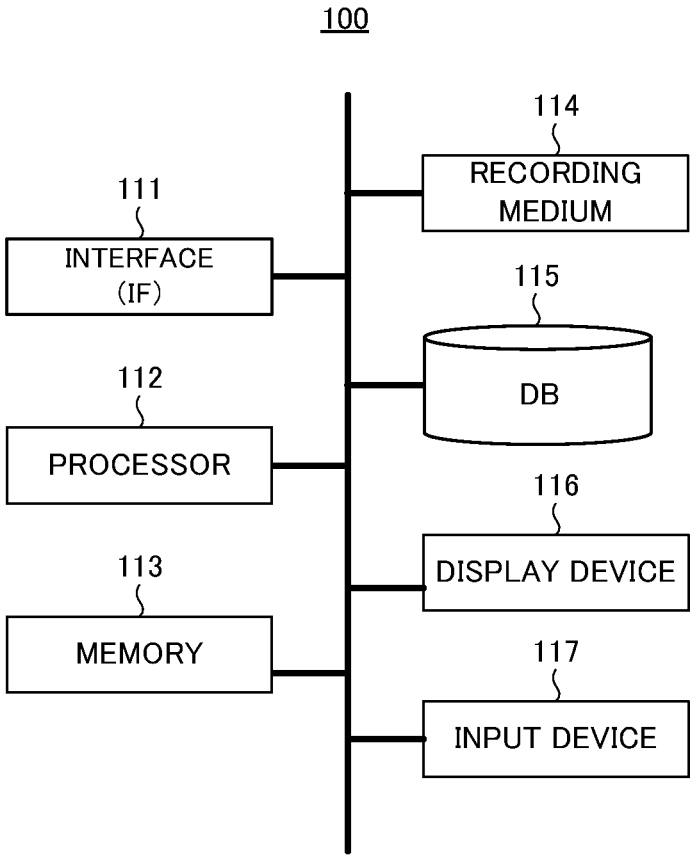
FIG. 1 is a block diagram showing a hardware configuration of an image processing device according to a first example embodiment.

FIG. 1 is a block diagram illustrating a hardware configuration of an image processing device according to a first example embodiment. As shown in FIG. 1, the image processing device 100 includes an interface (IF) 111, a processor 112, a memory 113, a recording medium 114, a data base (DB) 115, a display device 116, and an input device 117.

The IF 111 inputs and outputs data to and from external devices. The IF 111 receives, for example, face images of target persons captured by a camera.

The processor 112 is a computer such as a CPU (Central Processing Unit) and controls the entire image processing device 100 by executing a program prepared in advance. Specifically, the processor 112 performs processing for the generation of another face image in which the attribute of the face image of the target person is converted.

The memory 113 may include a ROM (Read Only Memory), a RAM (Random Access Memory), and the like. The memory 113 is also used as a working memory during various processing operations by the processor 112.

The recording medium 114 is a non-volatile and non-transitory recording medium such as a disk-like recording medium or a semiconductor memory, and is configured to be attachable to and detachable from the image processing device 100. The recording medium 114 records various programs executed by the processor 112. When the image processing device 100 executes various kinds of processing, the program recorded on the recording medium 114 is loaded into the memory 113 and executed by the processor 112.

The DB 115 stores the face images received by the IF 111 and the face images after attribute conversion generated by the processing of the processor 112.

The display device 116, for example, has a liquid crystal display or the like. In addition, the display device 116 displays the face image after the attribute conversion generated by the processing of the processor 112, as necessary.

The input device 117 includes, for example, at least one of a keyboard, a mouse, and a touch panel. The input device 117 issues instructions to the processor 112 according to the user's operation. Specifically, the input device 117 performs an instruction related to the attribute conversion of the face image of the target person according to the user's operation.

[Functional Configuration]

Figure 2:
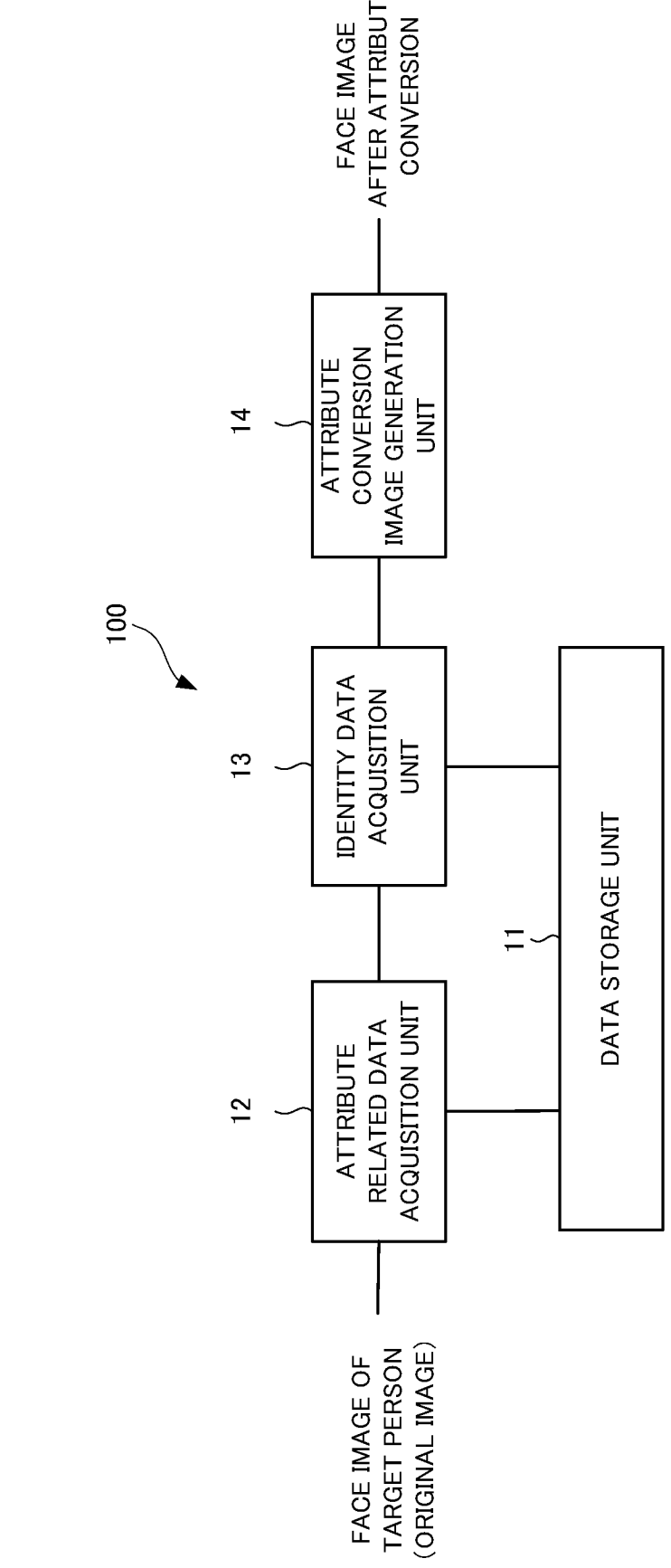
FIG. 2 is a block diagram showing a functional configuration of the image processing device according to the first example embodiment.

FIG. 2 is a block diagram illustrating a functional configuration of the image processing device according to the first example embodiment. As shown in FIG. 2, the image processing device 100 includes a data storage unit 11, an attribute related data acquisition unit 12, an identity data acquisition unit 13, and an attribute conversion image generation unit 14.

The data storage unit 11 stores data in which n (n≥2) face images and feature information which is information representing the feature of each of the n face images are associated. The above-described feature information may include, for example, at least one of the feature value and the latent space vector corresponding to each of the n face images. The latent space vector can be generated as a vector including a feature value of latent space disclosed in, for example, Diederik P. Kingma, et. al, "Glow: Generative Flow with Invertible 1×1 Convolutions", and the like.

The attribute related data acquisition unit 12 acquires the attribute related data based on the face image of a target person (hereinafter also referred to as the original image) that is inputted from the outside of the image processing device 100 and the data stored in the data storing unit 11, and outputs the acquired attribute related data to the identity data acquisition unit 13.

Here, a first specific example of a method of acquiring attribute related data will be described.

The attribute related data acquisition unit 12 extracts the feature value calculated from the original image as the feature information representing the feature of the original image. Also, the attribute related data acquisition unit 12 extracts a plurality of face images having a first attribute and a plurality of face images having a second attribute from the data stored in the data storage unit 11. In the present specific example, it is desirable that the attribute related data acquisition unit 12 extracts the face image such that either the first attribute or the second attribute becomes the same attribute included in the original image. The attribute related data acquisition unit 12 generates the first average face image representing the average state of the first attribute on the basis of the plurality of face images having the first attribute and the plurality of feature values associated with each of the plurality of face images. Also, the attribute related data acquisition unit 12 generates the second average face image representing the average state of the second attribute on the basis of the plurality of face images having the second attribute and the plurality of feature values associated with each of the plurality of face images. In addition, the attribute related data acquisition unit 12 calculates a difference vector corresponding to a vector indicating a difference between the first average face image and the second average face image. Further, the attribute related data acquisition unit 12 calculates m difference vectors, by repeatedly performing the above-described processing m (m≥2) times while changing the face image or attribute to be extracted from the data stored in the data storage unit 11. Then, the attribute related data acquisition unit 12 acquires data including the feature information (feature value) representing the feature of the original image and the m difference vectors calculated as described above as the attribute related data. The attribute related data acquisition unit 12 may start the processing related to the calculation of the m difference vectors at the timing when the instruction related to the attribute conversion of the face image is performed, for example. The attribute-related data acquisition unit 12 may complete the processing related to the calculation of the m difference vectors before the instruction related to the attribute conversion of the face image is performed, for example.

Next, a second specific example of a method of acquiring attribute related data will be described.

The attribute related data acquisition unit 12 extracts the latent space vector calculated from the original image as the feature information representing the feature of the original image. Also, the attribute related data acquisition unit 12 extracts a plurality of face images having a first attribute and a plurality of face images having a second attribute from the data stored in the data storage unit 11. In the present specific example, it is desirable that the attribute related data acquisition unit 12 extracts the face images such that either the first attribute or the second attribute becomes the same attribute included in the original image. Further, the attribute related data acquisition unit 12 generates a first average latent space vector representing the average state of the first attribute based on the latent space vector calculated from the original image, a plurality of face images having the first attribute, and a plurality of latent space vectors associated with each of the plurality of face images. Further, the attribute related data acquisition unit 12 generates a second average latent space vector representing the average state of the second attribute based on the latent space vector calculated from the original image, a plurality of face images having the second attribute, and a plurality of latent space vectors associated with each of the plurality of face images. Further, the attribute related data acquisition unit 12 calculates the difference vector corresponding to the vector indicating the difference between the first average latent space vector and the second average latent space vector. Further, the attribute related data acquisition unit 12 calculates m difference vectors by repeatedly performing the above-described processing m times while changing the face image or the attribute to be extracted from the data stored in the data storage unit 11. Then, the attribute related data acquisition unit 12 acquires data including the feature information representing the feature of the original image (latent space vector) and the m difference vectors calculated as described above as the attribute related data. The attribute related data acquisition unit 12 may, for example, start the processing related to the calculation of the m difference vectors at the timing when the instruction related to the attribute conversion of the face image is performed. In addition, the attribute related data acquisition unit 12 may complete the processing related to the calculation of the m difference vectors before the instruction related to the attribute conversion of the face image is performed, for example.

That is, according to the above-described specific examples, the attribute related data acquisition unit 12 acquires the attribute related data including the feature value or the latent space vector serving as the feature information representing the feature of the original image and the m difference vectors, and outputs the acquired attribute related data to the identity data acquisition unit 13.

Figure 3:
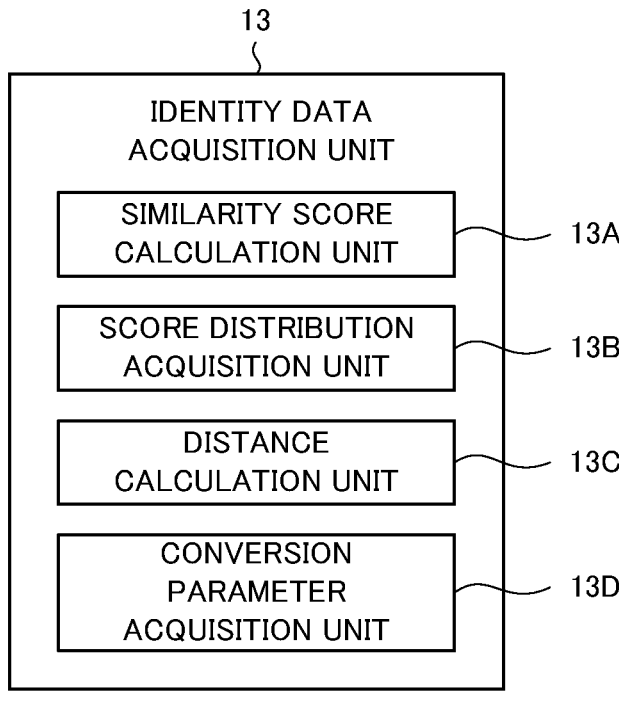
FIG. 3 is diagram illustrating an example of a configuration of an identity data acquisition unit included in the image processing device according to the first example embodiment.

The identity data acquisition unit 13 acquires at least one conversion parameter that can perform attribute conversion of the original image while maintaining the identity of the original image, based on the data stored in the data storage unit 11 and the attribute related data obtained by the attribute related data acquisition unit 12. The identity data acquisition unit 13 acquires the identity data including the above-described conversion parameters and the feature information included in the attribute related data acquired by the attribute related data acquisition unit 12, and outputs the acquired identity data to the attribute conversion image generation unit 14. As shown in FIG. 3, the identity data acquisition unit 13 includes a similarity score calculation unit 13A, a score distribution acquisition unit 13B, a distance calculation unit 13C, and a conversion parameter acquisition unit 13D. FIG. 3 is a diagram illustrating an example of the configuration of an identity data acquisition unit 13 included in the image processing device 100 according to the first example embodiment.

The similarity score calculation unit 13A has a function as a score calculation means. The similarity score calculation unit 13A calculates n similarity scores (hereinafter, also referred to as a "similarity score group corresponding to the original image") indicating how much the original image is similar to each of the n face images, based on the feature information included in the data stored in the data storage unit 11 and the feature information included in the attribute related data. The similarity score calculation unit 13A acquires m converted feature information by individually using the m difference vectors included in the attribute related data and converting the feature information included in the attribute related data. In other words, the similarity score calculation unit 13A acquires the m converted feature information by individually applying m conversion methods corresponding to the m difference vectors each included in the attribute related data to the feature information included in the attribute related data. The similarity score calculation unit 13A calculates m sets of n similarity scores (hereinafter, also referred to as "a similarity score group corresponding to the face image after attribute conversion") indicating how much the face image after attribute conversion is similar to each of the n face images, based on the feature information included in the data stored in the data storage unit 11 and the m converted feature information.

The score distribution acquisition unit 13B has a function as a score distribution acquisition means. The score distribution acquisition unit 13B extracts p ($2 \leq p \leq n$) similarity scores for the similarity score group corresponding to the original image, and acquires a score distribution indicating the distribution state of the extracted p similarity scores. That is, the score distribution corresponding to the original image may indicate a distribution state of at least a part of the similarity scores in the similarity score group corresponding to the original image. In addition, the score distribution acquisition unit 13B extracts p similarity scores for each of the m sets of similarity scores corresponding to the face images after the attribute conversion, and acquires a score distribution indicating the distribution state of the extracted p similarity scores. According to such a process, the score distribution acquisition unit 13B can acquire m score distributions corresponding to the face images after the attribute conversion. When acquiring the score distribution corresponding to the original image and the m score distributions corresponding to the face images after the attribute conversion, the score distribution acquisition unit 13B desirably uses p similarity scores calculated from p common face images among the n face images stored in the data storage unit 11.

When acquiring the score distribution corresponding to the original image and the m score distributions corresponding to the face images after the attribute conversion, the score distribution acquisition unit 13B may acquire the score distribution indicating the distribution state of the top k ($2 \leq k \leq p$) pieces of similarity scores among the p similarity scores described above. According to this process, the score distribution acquisition unit 13B can acquire a score distribution in which, among the p similarity scores, the (p–k) similarity scores of relatively low degree of importance are excluded and the k pieces of similarity scores of relatively high degree of importance are included. Therefore, according to the above-described process, it is possible to improve the processing speed of acquiring the identity data, for example. Further, according to the above-described process, it is possible to reduce the amount of memory used in the process related to the acquisition of the identity data, for example.

For example, when q (1≤q) pieces of similarity scores whose increase amount of the score from the similarity score corresponding to the original image is large are calculated as a similarity score corresponding to the face image after the attribute conversion, the score distribution acquisition unit 13B may acquire the score distribution indicating the distribution state of the (p+q) pieces of similarity scores as the score distributions corresponding to the face images after the attribute conversion. In such a case, the score distribution acquisition unit 13B may replace the score distribution corresponding to the original image with the score distribution indicating the distribution state of the (p+q) pieces of similarity scores calculated from the common (p+q) pieces of face images out of the n face images. According to this process, the score distribution acquisition unit 13B can acquire a score distribution including p similarity scores and q similarity scores having higher importance than the p similarity scores. Therefore, according to the above-described process, for example, it is possible to improve the processing efficiency of acquiring the identity data.

That is, the score distributions corresponding to the face images after the attribute conversion may indicate the distribution state of at least a part of the similarity scores in the similarity score groups corresponding to the face images after the attribute conversion. The score distribution acquisition unit 13B may use the similarity scores calculated from the common face image to acquire the score distribution corresponding to the original image and the m score distributions corresponding to the face images after the attribute conversion.

The distance calculation unit 13C has a function as a distance calculation means. The distance calculation unit 13C calculates m distances as the distance between the score distribution corresponding to the original image and the m score distributions corresponding to the face images after the attribute conversion. Specifically, the distance calculation unit 13C calculates the distance between the score distributions by, for example, performing an operation using KL (Kullback-Leibler) divergence in a condition in which the area of the score distribution corresponding to the original image is normalized to 1 and the area of each of the m score distributions corresponding to the face images after the attribute conversion is normalized to 1.

The conversion parameter acquisition unit 13D has a function as a conversion parameter acquisition means. The conversion parameter acquisition unit 13D extracts one score distribution for which the distance from the score distribution corresponding to the original image is minimum from the m score distributions corresponding to the face images after the attribute conversion, based on the m distance calculation results. The conversion parameter acquisition unit 13D specifies, from among the m difference vectors included in the attribute related data, one difference vector used to calculate the similarity score group included in the one score distribution extracted as described above. In addition, the conversion parameter acquisition unit 13D acquires the specified one difference vector as described above as one conversion parameter capable of performing attribute conversion of the original image while maintaining the identity of the original image. The conversion parameter acquisition unit 13D acquires identity data including the one conversion parameter described above and the feature information of the attribute related data acquired by the attribute related data acquisition unit 12, and outputs the acquired identity data to the attribute conversion image generation unit 14.

The conversion parameter acquisition unit 13D may extract a plurality of score distributions from the m score distributions corresponding to the face images after the attribute conversion in order of shortest distance from the score distribution corresponding to the original image, and specify a plurality of difference vectors used to calculate the similarity score groups included in the plurality of score distributions, from the m difference vectors included in the attribute related data. In such a case, the conversion parameter acquisition unit 13D may acquire the plurality of difference vectors specified as described above as a plurality of conversion parameters capable of performing attribute conversion of the original image while maintaining the identity of the original image.

The conversion parameter acquisition unit 13D may extract a plurality of score distributions whose distance from the score distribution corresponding to the original image is equal to or smaller than a threshold from the m score distributions corresponding to the face images after the attribute conversion, and specify a plurality of difference vectors used to calculate the similarity score groups included in the plurality of score distributions from among the m difference vectors included in the attribute related data. In such a case, the conversion parameter acquisition unit 13D may acquire the plurality of difference vectors specified as described above as a plurality of conversion parameters capable of performing attribute conversion of the original image while maintaining the identity of the original image within a certain range.

That is, the conversion parameter acquisition unit 13D acquires at least one conversion parameter corresponding to at least one conversion method from among the m conversion methods applied in the similarity score calculation unit 13A, based on the comparison result between the score distribution corresponding to the original image and the m score distributions corresponding to the face images after the attribute conversion. The conversion parameter acquisition unit 13D acquires the conversion parameter by comparing the m distances obtained by the distance calculation unit 13C. In addition, the conversion parameter acquisition unit 13D extracts, based on the m distance calculation results, one score distribution having the smallest distance from the score distribution corresponding to the original image from the score distributions corresponding to the m face images after the attribute conversion, and acquires one conversion parameter corresponding to one conversion method applied to the original image in order to acquire the one score distribution. In addition, the conversion parameter acquisition unit 13D extracts, based on the calculation results of the m distances, a plurality of score distributions in order of shortest distance from the score distribution of the original image from the score distributions corresponding to the m face images after the attribute conversion, and acquires a plurality of conversion parameters corresponding to each of the plurality of conversion methods applied to the original image in order to acquire the plurality of score distributions.

The attribute conversion image generation unit 14 has a function as an image generation means. The attribute conversion image generation unit 14 generates a face image by converting the attribute of the original image on the basis of the conversion parameter and the feature information included in the identity data outputted from the identity data acquisition unit 13. Specifically, the attribute conversion image generation unit 14 generates a face image by converting the attribute of the original image by inputting one difference vector corresponding to the one conversion parameter included in the identity data and the feature value or the latent space vector included in the feature information of the identity data to a learned image generation model, for example.

For example, when a plurality of difference vectors corresponding to a plurality of conversion parameters is included in the identity data, the attribute conversion image generation unit 14 may generate a plurality of face images by converting the attribute of the original image on the basis of each of the plurality of difference vectors and the feature information included in the identity data. According to such a process, for example, a plurality of face images after attribute conversion can be presented to the user, and the user can select one face image for which the most suitable attribute conversion is made, from among the plurality of face images.

According to the functions of the respective parts of the image processing device 100 as described above, as long as the average face image or the average latent space vector can be generated, it is possible to generate the face image in which the attributes of the original image are converted while maintaining the identity of the original image. Specifically, according to the functions of the respective parts of the image processing device 100 as described above, for example, it is possible to generate a face image in which the age of the original image is increased or decreased while maintaining the identity of the original image. Further, according to the functions of the respective parts of the image processor 100 as described above, for example, it is possible to generate a face image in which BMI (Body Mass Index) of the original image is increased or decreased while maintaining the identity of the original image. Further, according to the functions of the respective parts of the image processing device 100 as described above, for example, it is possible to generate a face image in which the illness state of the original image is improved or deteriorated while maintaining the identity of the original image. Incidentally, examples of the attributes which can be converted by the image processing device 100 according to the present example embodiment include age, weight, BMI, sex, race, and makeup.

[Processing Flow]

Figure 4:
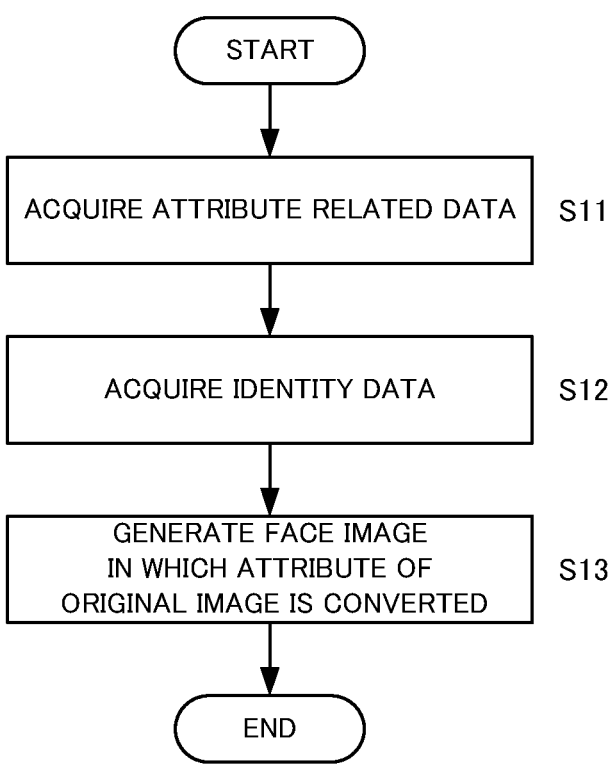
FIG. 4 is a flowchart illustrating an example of processing performed by the image processing device according to the first example embodiment.

Subsequently, a flow of processing performed in the image processing device according to the first example embodiment will be described. FIG. 4 is a flowchart illustrating an example of processing that is performed in the image processing device according to the first example embodiment.

First, the attribute related data acquisition unit 12 acquires the attribute related data including the feature information representing the feature of the original image and m difference vectors by performing the process of either the first example or the second example described above (step S11).

Next, the identity data acquisition unit 13 acquires identity data including the feature information representing the feature of the original image and at least one conversion parameter capable of performing attribute conversion of the original image while maintaining the identity of the original image, by the processing based on the attribute related data obtained by the step S11 (step S12).

Subsequently, the attribute conversion image generation unit 14 generates a face image by converting the attribute of the original image based on the identity data obtained by the step S12 (step S13).

As described above, according to the present example embodiment, the difference vector obtained on the basis of the comparison result of the plurality of score distributions including the similarity score group is used as the conversion parameter to generate the face image in which the attribute of the original image is converted. Therefore, according to this example embodiment, it is possible to generate an image in which the attribute of the original image is converted so that the identity of the original image is maintained.

Second Example Embodiment

Figure 5:
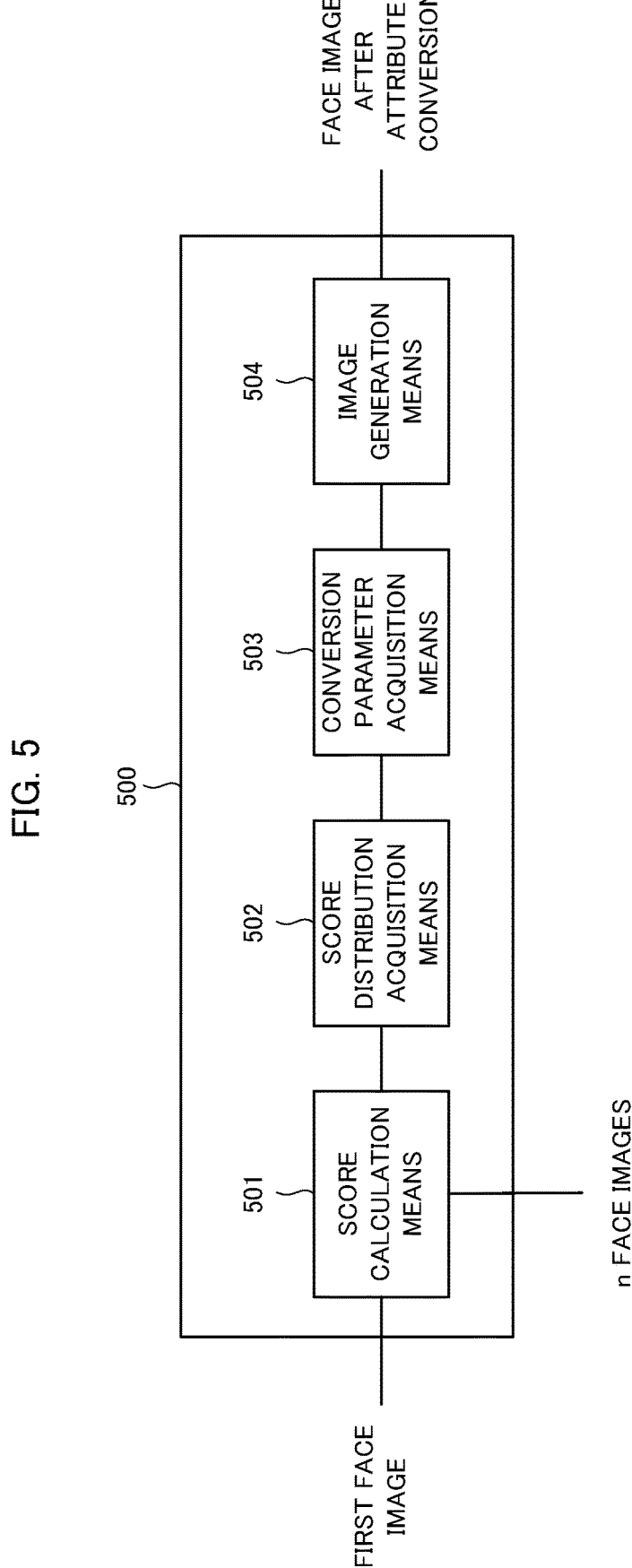
FIG. 5 is a block diagram showing a functional configuration of an image processing device according to a second example embodiment.

FIG. 5 is a block diagram illustrating a functional configuration of an image processing device according to a second example embodiment.

The image processing device 500 according to this example embodiment has the same hardware configuration as that of the image processing device 100. The image processing device 500 includes a score calculation means 501, a score distribution acquisition means 502, a conversion parameter acquisition means 503, and an image generation means 504.

Figure 6:
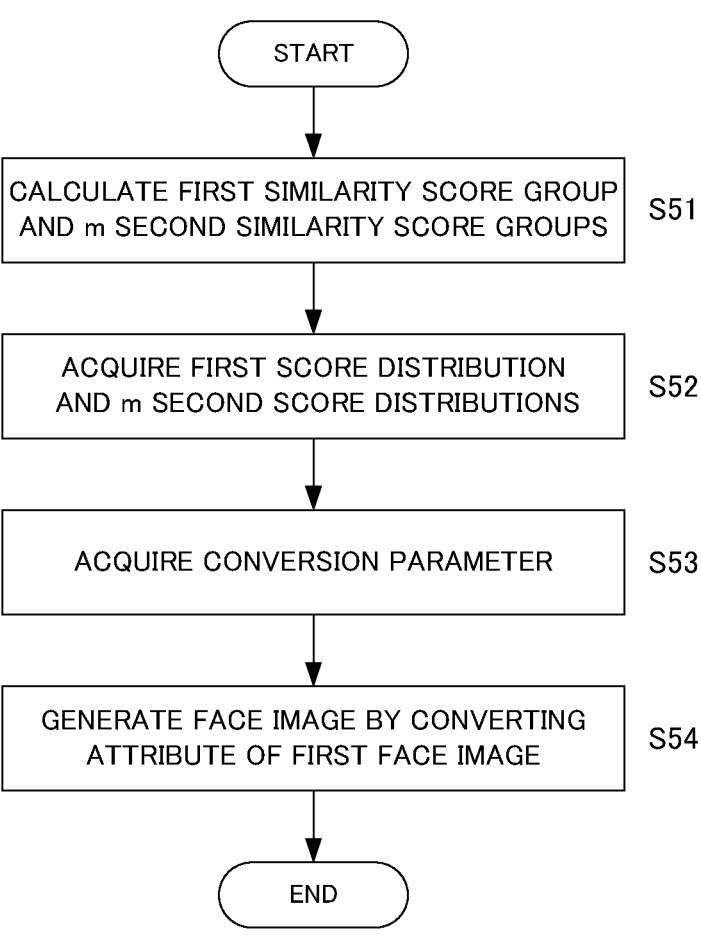
FIG. 6 is a flowchart for explaining processing performed in the image processing device according to the second example embodiment.

FIG. 6 is a flowchart for explaining processing performed in the image processing device according to the second example embodiment.

The score calculation means 501 calculates a first similarity score group and m second similarity score groups (step S51). The first similarity score group includes n similarity scores indicating similarity between a first face image corresponding to a face image of a target person and each of n (n≥2) face images. The m second similarity score groups include n similarity scores indicating similarity between m second face images and each of the n face images. The m second face images are obtained by converting an attribute of the first face image by individually applying m (m≤2) conversion methods to the first face image.

The score distribution acquisition means 502 acquires a first score distribution and m second score distributions (step S52). The first score distribution indicates a distribution state of at least a part of the similarity scores in the first similarity score group. The m second score distributions indicates a distribution state of at least a part of the similarity scores in each of the m second similarity score groups.

The conversion parameter acquisition means 503 acquires at least one conversion parameter corresponding to at least one conversion method from among the m conversion methods based on comparison results between the first score distribution and the m second score distributions (step S53).

The image generation means 504 generates a face image by converting the attribute of the first face image based on the conversion parameter (step S54).

According to the present example embodiment, it is possible to generate an image in which the attribute of the original image is converted so that the identity of the original image is maintained.

A part or all of the example embodiments described above may also be described as the following supplementary notes, but not limited thereto.

Supplementary Note 1

An image processing device comprising:

a score calculation means configured to calculate a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≤2) conversion methods to the first face image;

a score distribution acquisition means configured to acquire a first score distribution and m second score distributions, the first score distribution indicating a distribution state of at least a part of the similarity scores in the first similarity score group, the m second score distributions indicating a distribution state of at least a part of the similarity scores in each of the m second similarity score groups;

a conversion parameter acquisition means configured to acquire at least one conversion parameter corresponding to at least one conversion method from among the m conversion methods based on comparison results between the first score distribution and the m second score distributions, and an image generation means configured to generate a face image by converting the attribute of the first face image based on the conversion parameter.

(Supplementary Note 2)

The image processing device according to Supplementary note 1, further comprising a distance calculation means configured to calculate m distances between the first score distribution and the m second score distributions, wherein the conversion parameter acquisition means acquires the conversion parameter by comparing calculation results of the m distances.

(Supplementary Note 3)

The image processing device according to Supplementary note 2, wherein the conversion parameter acquisition means extracts one score distribution for which the distance from the first score distribution becomes minimum from the m second score distributions, based on the calculation results of the m distances, and acquires one conversion parameter corresponding to one conversion method applied to the first face image for acquiring the one score distribution.

(Supplementary Note 4)

The image processing device according to Supplementary note 2, wherein the conversion parameter acquiring means extracts a plurality of score distributions from the m second score distributions in order of smaller distance from the first score distribution based on the calculation results of the m distances, and acquires a plurality of conversion parameters corresponding to the plurality of conversion methods applied to the first face image to acquire the plurality of score distributions.

(Supplementary Note 5)

The image processing device according to Supplementary note 1, wherein the score distribution acquisition means uses p (2≤p≤n) similarity scores calculated from common p face images among the n face images to acquire the first score distribution and the m second score distributions.

(Supplementary Note 6)

The image processing device according to Supplementary note 5, wherein the score distribution acquisition means acquires the first score distribution indicating the distribution state of top k (2≤k≤p) similarity scores among the p similarity scores, and acquires the m second score distributions indicating the distribution state of the top k similarity scores among the p similarity scores.

(Supplementary Note 7)

An image processing method comprising:

calculating a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m=2) conversion methods to the first face image;

acquiring a first score distribution and m second score distributions, the first score distribution indicating a distribution state of at least a part of the similarity scores in the first similarity score group, the m second score distributions indicating a distribution state of at least a part of the similarity scores in each of the m second similarity score groups;

acquiring at least one conversion parameter corresponding to at least one conversion method from among the m conversion methods based on comparison results between the first score distribution and the m second score distributions, and generating a face image by converting the attribute of the first face image based on the conversion parameter.

(Supplementary Note 8)

A recording medium recording a program, the program causing a computer to execute processing comprising:

calculating a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≥2) conversion methods to the first face image;

acquiring a first score distribution and m second score distributions, the first score distribution indicating a distribution state of at least a part of the similarity scores in the first similarity score group, the m second score distributions indicating a distribution state of at least a part of the similarity scores in each of the m second similarity score groups;

acquiring at least one conversion parameter corresponding to at least one conversion method from among the m conversion methods based on comparison results between the first score distribution and the m second score distributions, and generating a face image by converting the attribute of the first face image based on the conversion parameter.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

This application is based upon and claims the benefit of priority from Japanese Patent Application 2022-191125, filed on Nov. 30, 2022, the disclosure of which is incorporated herein in its entirety by reference.

DESCRIPTION OF SYMBOLS

11 Data storage unit
12 Attribute related data acquisition unit
13 Identity data acquisition unit
14 Attribute conversion image generation unit
100 Image processing device

The invention claimed is:

1. An image processing device comprising:
a memory configured to store instructions; and
one or more processors configured to execute the instructions to:
calculate a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≥2) conversion methods to the first face image;
acquire a first score distribution and m second score distributions, the first score distribution indicating a distribution state of at least a part of the similarity scores in the first similarity score group, the m second score distributions indicating a distribution state of at least a part of the similarity scores in each of the m second similarity score groups;
acquire at least one conversion parameter corresponding to at least one conversion method from among the m conversion methods based on comparison results between the first score distribution and the m second score distributions, and
generate a face image by converting the attribute of the first face image based on the conversion parameter.

2. The image processing device according to claim 1, wherein the processor is further configured to execute the instructions to calculate m distances between the first score distribution and the m second score distributions, and
wherein the processor acquires the conversion parameter by comparing calculation results of the m distances.

3. The image processing device according to claim 2, wherein the processor extracts one score distribution for which the distance from the first score distribution becomes minimum from the m second score distributions, based on the calculation results of the m distances, and acquires one conversion parameter corresponding to one conversion method applied to the first face image for acquiring the one score distribution.

4. The image processing device according to claim 2, wherein the processor extracts a plurality of score distributions from the m second score distributions in order of smaller distance from the first score distribution based on the calculation results of the m distances, and acquires a plurality of conversion parameters corresponding to the plurality of conversion methods applied to the first face image to acquire the plurality of score distributions.

5. The image processing device according to claim 1, wherein the processor uses p (2≤p≤n) similarity scores calculated from common p face images among the n face images to acquire the first score distribution and the m second score distributions.

6. The image processing device according to claim 5, wherein the processor acquires the first score distribution indicating the distribution state of top k (2≤k≤p) similarity scores among the p similarity scores, and acquires the m second score distributions indicating the distribution state of the top k similarity scores among the p similarity scores.

7. An image processing method comprising:
calculating a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≥2) conversion methods to the first face image;
acquiring a first score distribution and m second score distributions, the first score distribution indicating a distribution state of at least a part of the similarity scores in the first similarity score group, the m second score distributions indicating a distribution state of at least a part of the similarity scores in each of the m second similarity score groups;
acquiring at least one conversion parameter corresponding to at least one conversion method from among the m conversion methods based on comparison results between the first score distribution and the m second score distributions, and
generating a face image by converting the attribute of the first face image based on the conversion parameter.

8. A non-transitory computer-readable recording medium recording a program, the program causing a computer to execute processing comprising:
calculating a first similarity score group and m second similarity score groups, the first similarity score group including n similarity scores indicating similarity between a first face image corresponding to a face image of a target person and each of n (n≥2) face images, the m second similarity score groups including n similarity scores indicating similarity between m second face images and each of the n face images, the m second face images being obtained by converting an attribute of the first face image by individually applying m (m≥2) conversion methods to the first face image;
acquiring a first score distribution and m second score distributions, the first score distribution indicating a distribution state of at least a part of the similarity scores in the first similarity score group, the m second score distributions indicating a distribution state of at least a part of the similarity scores in each of the m second similarity score groups;

acquiring at least one conversion parameter corresponding to at least one conversion method from among the m conversion methods based on comparison results between the first score distribution and the m second score distributions, and generating a face image by converting the attribute of the first face image based on the conversion parameter.

\* \* \* \* \*